(12) United States Patent
Cripe

(10) Patent No.: US 6,220,105 B1
(45) Date of Patent: Apr. 24, 2001

(54) MAGNETOELASTIC DISC-SHAPED LOAD CELL HAVING SPIRAL SPOKES

(75) Inventor: David W. Cripe, Camp Point, IL (US)

(73) Assignee: Magna-Lastic Devices, Inc., Carthage, IL (US)

( * ) Notice: Subject to any disclaimer, the term of this patent is extended or adjusted under 35 U.S.C. 154(b) by 0 days.

(21) Appl. No.: 09/527,689

(22) Filed: Mar. 17, 2000

Related U.S. Application Data
(60) Provisional application No. 60/129,614, filed on Apr. 16, 1999.

(51) Int. Cl.[7] .................................................... G01L 1/12
(52) U.S. Cl. ................................. 73/862.69; 73/862.333
(58) Field of Search .............................. 73/779, 862.333, 73/862.334, 862.335, 862.69

(56) References Cited

U.S. PATENT DOCUMENTS

| | | |
|---|---|---|
| 3,453,876 | 7/1969 | Radus . |
| 3,577,108 | 5/1971 | Bengtson et al. . |
| 3,863,508 * | 2/1975 | Scarborough et al. ........... 73/514.06 |
| 3,932,112 | 1/1976 | Garshelis . |
| 3,939,448 | 2/1976 | Garshelis . |
| 3,959,751 | 5/1976 | Garshelis . |
| 4,048,851 | 9/1977 | Portier . |
| 4,561,314 | 12/1985 | Alley et al. . |
| 4,760,745 | 8/1988 | Garshelis . |
| 4,857,841 * | 8/1989 | Hastings et al. ................. 324/207.21 |
| 4,896,544 | 1/1990 | Garshelis . |
| 5,195,377 | 3/1993 | Garshelis . |
| 5,351,555 | 10/1994 | Garshelis . |
| 5,465,627 | 11/1995 | Garshelis . |
| 5,520,059 | 5/1996 | Garshelis . |
| 5,591,925 | 1/1997 | Garshelis . |
| 5,708,216 | 1/1998 | Garshelis . |
| 6,047,605 * | 4/2000 | Garshelis ........................ 73/862.336 |

FOREIGN PATENT DOCUMENTS

| | | |
|---|---|---|
| 0 352 187 | 1/1990 | (EP) . |
| 59-009528 | 1/1984 | (JP) . |
| 99/21150 | 4/1999 | (WO) . |

OTHER PUBLICATIONS

Garshelis, "The Wiedemann Effects and Applications", IEEE Applied Magnetics conference, 75 CHO964–7 MAG, 38 pages (1975).

(List continued on next page.)

*Primary Examiner*—Max Noori
(74) *Attorney, Agent, or Firm*—Nixon Peabody LLP; Stuart J. Friedman

(57) ABSTRACT

A magnetoelastic load cell for providing an output signal indicative of a force applied to the load cell comprises a magnetoelastically active, ferromagnetic, magnetostrictive disk-shaped member having upper and lower surfaces and comprising a central hub, an annular rim and at least two slots formed therebetween for defining at least two generally spiral-shaped spokes extending between the upper and lower surfaces, each of the spokes traversing approximately 360° between its origin at the hub and its termination at the rim. The spokes are magnetically polarized in a single circumferential direction and possess sufficient magnetic anisotropy to return the magnetization in the spokes, following the application of a force to the load cell, to the single circumferential direction when the applied force is reduced to zero. Magnetic field sensor means are mounted proximate to the member to sense the magnitude of the magnetic field produced by the member in response to the applied force. The member is formed of a polycrystalline material wherein at least 50% of the distribution of local magnetizations lie within a 90° quadrant symmetrically disposed around the single circular direction and has a coercivity sufficiently high that the field arising from the member does not magnetize proximate regions of the member to give rise to parasitic magnetic fields which are of sufficient strength to destroy the usefulness, for force sensing purposes, of the net magnetic field seen by the magnetic field sensor means.

24 Claims, 2 Drawing Sheets

OTHER PUBLICATIONS

Garshelis, "Conditions for stress induced bulk moments", J.Appl.Phys. 50(3),pp. 1680–1682, Mar. 1979.

Garshelis, "A Versatile Magnetostrictive Displacement Transducer", IEEE Industrial Electronics Control Instrumentation Conference, 76 CH1 117–1 IECI,99–105 (1976).

Garshelis, "A Study of the Inverse Wiedemann Effect on Circular Remanence", IEEE Transactions On Magnetics, vol. MAG–10, No. 2, Jun. 1974, pp. 344–358.

Y. Nonomura et al., "Measurements of Engine Torque with the Intra–Bearing Torque Sensor", SAE Technical Paper, 1988, pp. 2.329–2.339.

Garshelis, "Development of a Non–Contact Torque Transducer for Electric Power Steering System", SAE Technical Paper, 1992, pp. 172–182.

Garshelis, "A Torque Transducer Utilizing A Circularly Polarized Ring", IEEE Transactions on Magnetics vol. 28, No. 5, Sep. 1992, pp. 2202–2204.

Garshelis et al., "A Single Transducer for Non–Contact Measurement of the Power, Torque and Speed of a Rotating Shaft", SAE Technical Paper, 1995, pp. 57–65.

Garshelis et al., "A magnetoelastic torque transducer utilizing a ring dividing into two oppositely polarized circumferential regions", J.Appl.Phys. 79 (8), Apr. 15, 1996, pp. 4756–4758.

Garshelis, "Development of a Magnetoelastic Torque Transducer for Automotive Transmission Applications", SAE Technical Paper No. 970605.

* cited by examiner

MAGNETOELASTIC DISC-SHAPED LOAD CELL HAVING SPIRAL SPOKES

CROSS-REFERENCE TO RELATED APPLICATIONS

This application claims the priority of U.S. provisional application Ser. No. 60/129,614, filed Apr. 16, 1999.

FIELD OF THE INVENTION

The present invention relates to load cells and, more particularly, to non-contacting magnetoelastic load cells for use in measuring applied force.

BACKGROUND OF THE INVENTION

The strain gage load cell is one of the more common means of measuring force. It is a precisely machined structure which responds with a deformation to a given applied force. A strain gage bonded to a deformable element exhibits a change in resistance according to the degree of deformation, which results in an electrical signal indicative of the magnitude of the applied force. However, since the strain gage is bonded directly to the load cell, it does not permit rotation of the load cell with respect to the sensing electronics. Unless slip rings or some form of isolated electronics are utilized, it is impossible with a strain gage load cell to measure axial loads on a rotating shaft. Moreover, strain gage sensors are very expensive and are thus commercially impractical for competitive use in many load cell applications.

It is well known that the axial deflection of a helical spring produces a torsional strain in the spring material. For this reason, when a solenoidal coil spring constructed of a magnetoelastically active steel and circumferentially magnetized around the axis of the wire forming the coil is placed under axial loading, the coil wire twists, causing a reorientation of the magnetization in the wire, with the magnetization becoming increasingly helical as the axial loading increases. As a result, the helical magnetization has both a circumferential component and an axial component, i.e., parallel to the wire in the coil. The axial component of magnetization causes a magnetic field to arise which extends in a direction parallel to the axis of the coil spring. This magnetic field can be sensed and an electrical signal developed which ideally should be proportional to the magnitude of the axial loading. However, due to the forming process of straight wire into a coil spring, internal residual stresses are created within the coil which develop their own magnetic fields under stress and which contribute to the net field sensed by the magnetic field sensors. As a result, the electrical signal which is developed is not solely a function of the applied axial load but also reflects the contribution of the internal residual stresses developed during processing. Accordingly, such solenoidal coil springs do not provide inherently accurate and reproducible results and do not represent a good choice for measuring axial loading, such as in load cells.

SUMMARY OF THE INVENTION

It is, therefore, an object of the present invention to provide a magnetoelastic load cell which permits the measurement of axial loads on a rotating shaft and which provides an output signal accurately correlated to the applied load.

It is another object of the present invention to provide a magnetoelastic load cell which depends upon the magnetocrystalline anisotropy of the shaft itself as the primary source of anisotropy for returning the magnetization to its previously established circumferential direction when the applied load is reduced to zero.

It is still another object of the invention to provide a magnetoelastic load cell which depends for its operation on the sensing of a quantity that is inherently zero when the applied load being measured is zero and which changes in both direction and magnitude in a correlative manner with the load being measured.

It is yet another object of the invention to provide a magnetoelastic load cell which requires no external exciting field for its operation and which requires neither exciting currents nor coils.

A still further object of the invention is to provide a non-contact method for measuring a force applied to a surface comprising the steps of providing a magnetoelastically active, ferromagnetic, magnetostrictive disk-shaped member to which the force is applied, the member having an upper surface and a lower surface and comprising a central hub, an annular rim and at least two slots formed through the member between the hub and the rim for defining at least two generally spiral-shaped spokes extending between the upper surface and the lower surface of the member, each of the spokes traversing approximately 360° between its origin at the hub and its termination at the rim, the spokes being magnetically polarized in a single circumferential direction and possessing sufficient magnetic anisotropy to return the magnetization in the spokes, following the application of a force to the surface, to the single circumferential direction when the applied force is reduced to zero; causing a magnetic field to arise from the member as a consequence of the application of force to the surface; and sensing the magnitude of the magnetic field at a position proximate to the magnetoelastically active member as an indication of the magnitude of the force applied to the surface; the magnetoelastically active member being formed of a polycrystalline material wherein at least 50% of the distribution of local magnetizations lie within a 90° quadrant symmetrically disposed around said single circular direction and having a coercivity sufficiently high that the field arising from said magnetoelastically active region does not magnetize regions of said member proximate to said magnetoelastically active region to give rise to parasitic magnetic fields which are of sufficient strength to destroy the usefulness, for force sensing purposes, of the net magnetic field seen by said magnetic field sensing means.

These objects and others are achieved by providing a load cell comprising a magnetoelastically active region including a ferromagnetic, magnetostrictive diskshaped member having an upper surface and a lower surface and comprising a central hub and an annular rim, the member having at least two slots formed therethrough between the hub and the rim for defining at least two generally spiral-shaped spokes extending between the upper surface and the lower surface of the member. Each of the spokes traverses approximately 360° between its origin at the hub and its termination at the rim, the spokes being magnetically polarized in a single circumferential direction and possessing sufficient magnetic anisotropy to return the magnetization in the spokes, following the application of a force to the region, to the single circumferential direction when the applied force is reduced to zero. Magnetic field sensors, such as a flux-gate inductors, are mounted proximate the member and are responsive to the active region field which arises as a result of the application of a stress in the region. The member is desirably formed of apolycrystalline material wherein at least 50% of the distribution of local magnetizations lie within a 90°
quadrant symmetrically disposed around the single circular
direction and has a coercivity sufficiently high, most preferably greater than 35 Oe, that the field arising from the
member does not magnetize proximate regions of the member to give rise to parasitic magnetic fields which are of
sufficient strength to destroy the usefulness, for force sensing purposes, of the net magnetic field seen by the magnetic
field sensors.

DETAILED DESCRIPTION OF THE PREFERRED EMBODIMENTS

Figure 1:
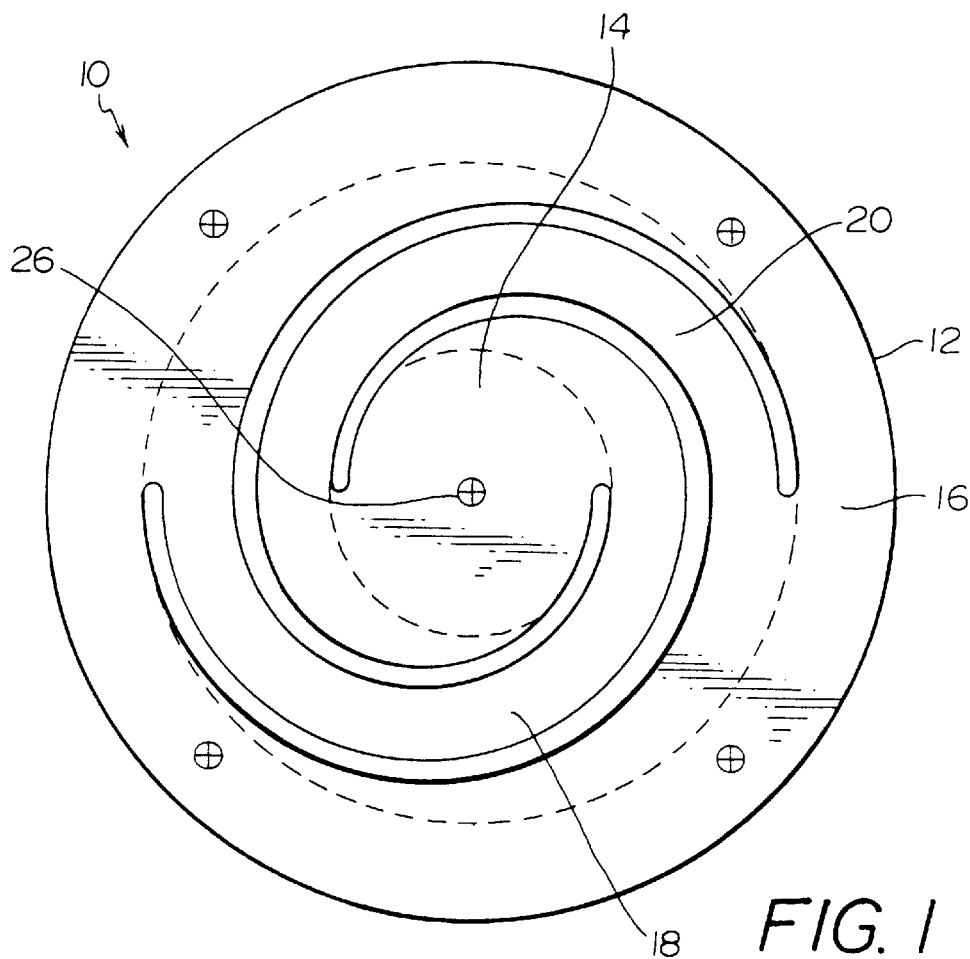
FIG. 1 is a plan view of the magnetoelastic load cell of the
present invention.
Figure 2:
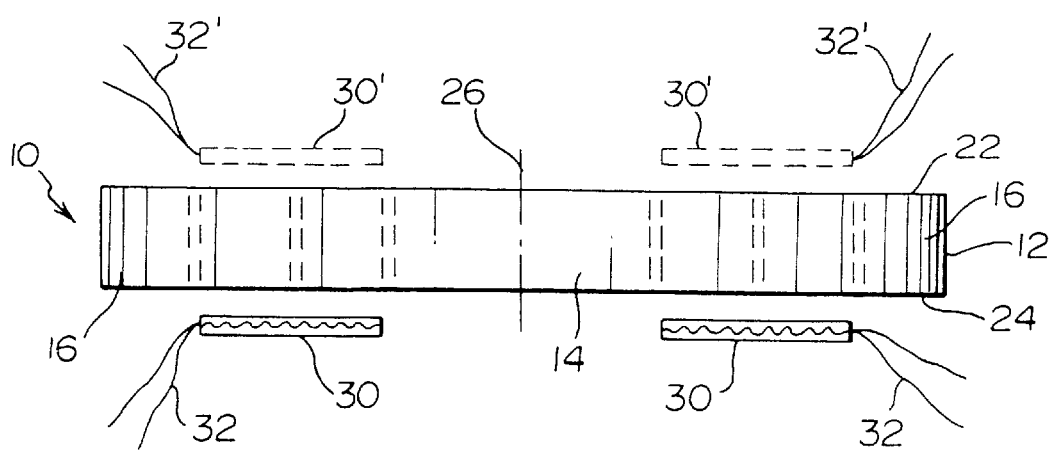
FIG. 2 is a front elevational view of one embodiment of
the magnetoelastic load cell of FIG. 1.

Referring first to FIGS. 1 and 2, a magnetoelastic load cell
according to the present invention is shown generally at 10.
Load cell 10 comprises a disk-shaped member 12 comprising a central hub 14 and an annular rim 16 between which
disk 12 is machined or otherwise formed to define a multiplicity of spiral spokes 18, 20 extending between the upper
surface 22 and the lower surface 24 of disk 12. Disk 12 is
the magnetically active element of the transducer and,
therefore, material selection for forming disk 12 is very
important. The material selected must be ferromagnetic to
assure the existence of magnetic domains and must be
magnetostrictive in order that the orientation of the magnetization may be altered by the stresses associated with the
applied force. In particular, disk 12 may be formed of a
material having a particularly desirable crystalline structure,
as will be described more fully hereinafter. Spokes 18, 20 are
magnetically polarized in one or the other substantially
purely circumferential direction about the generally spiral
axis of each spoke by any effective method, several of which
are disclosed in U.S. Pat. No. 5,520,059, the disclosure of
which is incorporated herein by reference. One particularly
effective magnetizing method involves passing a pulse of
current radially through disk 12 from its central axis 26 to its
outer periphery, passing enroute through the spokes 18, 20.
Although the number of spokes illustrated in FIG. 1 is two,
it will be appreciated that any number of spokes, not less
than two, may be formed. A disadvantage of utilizing more
than two spokes is the increased machining expense associated with forming the additional spokes. Each of the
spokes traverses approximately 360° between its origin at
hub 14 and its termination at rim 16. The thickness of disk
12 between its upper and lower surfaces 22, 24 is preferably
selected such that the cross section of each spoke is approximately square. It will be appreciated, however, that depending upon the number of spokes, the disk thickness and the
particular application for the load cell, the spoke cross
section may be other than square.

Prior to the application of a force to the load cell, the
magnetization in the spokes in substantially purely circular,
at least to the extent that it has no net magnetization
component in the direction of the axis of the spokes and has
no net radial magnetization components. As a force is
applied to the center of hub 14 in a direction which is parallel
to the axis 26 of disk 12, the force is transmitted through the
spiral spokes 18, 20, creating a torsional stress within the
spokes. As a result, the circular magnetization in each spoke
reorients and becomes increasingly helical as the applied
force increases. The helical magnetization has both a circumferential component and a component along the axis of
the spokes. As a result of the axial component of magnetization opposite magnetic poles form at the hub 14 and rim
16 and a radially directed magnetic field emerges from the
poles, the magnetic field being proportional in strength to the
magnitude of the force applied to the center of hub 14.

Magnetic field vector sensors 30 are located and oriented
relative to disk 12 so as to sense the magnitude and polarity
of the radial field arising in the space about the active
regions of disk 12 as a result of the reorientation of the
polarized magnetization from the quiescent circumferential
direction. Magnetic field vector sensors 30 provide a signal
output reflecting the magnitude of the torsional stress which
can be correlated with the magnitude of the applied force. In
one embodiment of the invention, magnetic field vector
sensor 30 is an integrated circuit Hall effect sensor. Wires 32
connect the magnetic field vector sensors 30 to a source of
direct current power, and transmit the signal output of the
magnetic field vector sensor to a receiving device (not
shown), such as a control or monitoring circuit for the
system incorporating disk 12. A more detailed discussion of
the types, characteristics, positioning and functioning of
magnetic field vector sensors appears in U.S. Pat. Nos.
5,351,555 at columns 6–9 and 5,520,059 at columns 7–11
and 25, the disclosures of which are incorporated herein by
reference.

Most preferred for use in connection with the load cell of
the present invention are flux-gate inductors having a solenoidal form which radially spans the spokes 18, 20 between
central hub 14 and rim 16. By virtue of their geometry, they
are sensitive to magnetic fields from end to end of their
cores. Thus, rather than merely sensing at a single point, the
preferred flux-gate inductors sense along the full radial
length of the spokes, averaging local moments from the
many domains developed along the radial extent of the
sensor. This characteristic of the sensor mitigates any negative effects which otherwise might have developed based
upon radial non-uniformity of the field which arises based
upon the developed torsional stress. Moreover, the hub 14
and rim 16 of the load cell act as field homogenizers further
attenuating any magnetic field nonuniformity due to the
spokes.

The radial field created and extending between the hub 14
and the rim 16 can be advantageously sensed, as shown in
FIG. 2, by one or more sensors 30 radially centered over the
disk 12 between the hub 14 and rim 16 in axial proximity to
the disk so as to measure the radial component of the
magnetic field between the hub 14 and rim 16. It is preferred
to use more than one magnetic sensor to detect the divergent
field produced by disk 12 in order that any low gradient
magnetic field, such as ambient fields, will be rejected.
When utilizing multiple sensors, it is preferred that they be
positioned in a circumferentially symmetrical, equiangular
distribution around the disk. Thus, if two sensors are utilized
on each side of disk 12, as shown in FIG. 2, they should be
arranged 180° apart. If three sensors are utilized, they should
be arranged 120° apart. It is important to note that the
magnetic circuit between disk 12 and sensors 30 is essential
to the operation of the load cell in order that as much as
possible of the flux flowing between the hub 14 and rim 16
passes through the sensors. For this reason, when load cell
10 is mounted, it must be mounted with non-ferromagnetic
spacers supporting the hub 14 and rim 16 so as not to provide
a flux path for bypassing the magnetic circuit between the
disk 12 and the sensors 30.

It is particularly preferred, as shown in phantom in FIG. 2, that a corresponding, duplicate set of sensors 30' having lead wires 32' be positioned on the opposite side of disk 12 so that one set of sensors 30 is positioned above and another set 30' below disk 12. This is a particularly advantageous configuration since the application of a force to the center of hub 14 is likely to cause displacement of the disk 12 relative to the sensors 30, 30'. If only an upper or only a lower set of sensors were utilized, a non-linear, parabolic response from the sensor might result due to the variation in the gap between the disk 12 and each sensor 30, 30'. However, when both upper and lower sets of sensors 30, 30' are utilized, the upper set will produce a response with opposite curvature from the lower set. By summing the outputs of both sets of field sensors, a substantially linear response will result which eliminates disk deflection under load as a problem.

Figure 3:
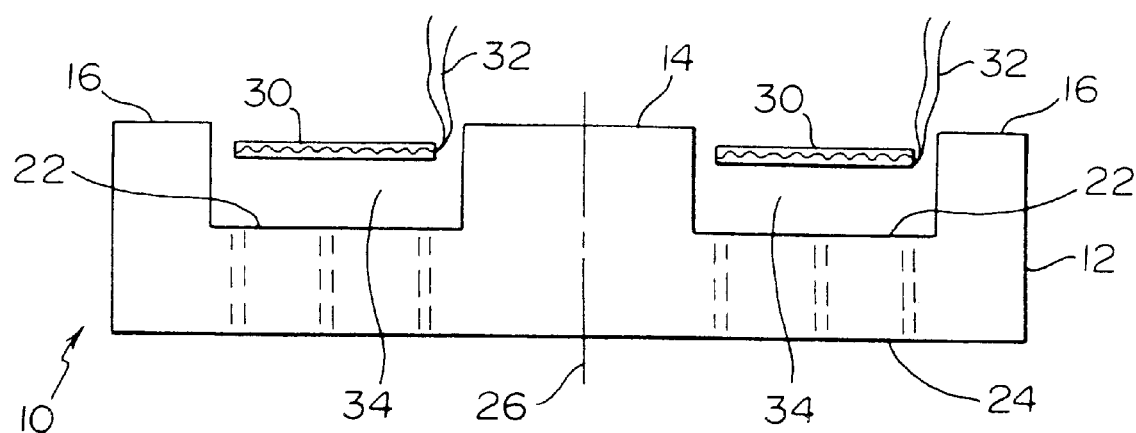
FIG. 3 is a front elevational view of another embodiment
of the magnetoelastic load cell of FIG. 1.

The effect of disk deflection can also be dealt with in other ways. For example, if the sensors 30 are compliantly mounted to disk 12, then the sensors would be displaced to the same extent as the disk 12, with the result that the gap between the sensors and the disk would not vary. Still another solution is shown in FIG. 3 wherein the central hub 14 and rim 16 are elevated above the upper surface 22 of disk 12 and the sensors 30 are positioned within the annular window 34 defined by the elevated hub and rim. In this configuration the raised hub and rim direct the magnetic field into the ends of the sensor 30 which, for example, may be a flux-gate inductor. As long as sensor 30 remains within window 34, axial displacement of the hub and rim will not change the permeance of the magnetic circuit, thus maintaining a linear system response. Of course, in those instances where the gap between the field sensors 30 and the disk 12 is much larger than the relative displacement of hub and rim under load, then the small relative change in the gap will have a negligible effect on the linearity of the sensor response.

The active region, hence the disk 12 itself, must possess some source of anisotropy to return the magnetization in the spokes to the established (during the polarization process) circumferential direction in each spoke when the applied force is reduced to zero. The product of the disk magnetostriction $\lambda$ and the torsional principal stress $\sigma$ provides the magnetoelastic anisotropic influence that is fundamental to the operation of the load cell. To ensure that the magnetoelastic anisotropy associated with the torque developed in the spokes causes all of the remanently magnetized portions of the spokes to contribute cooperatively in the development of a radial component of the magnetic field, the quiescent anisotropy should nowhere depart more than 45° from the circumferential direction. Stated otherwise, the need for anisotropy is an expression of the need to confine the circular remanence within the circumferentially oriented 90° quadrant. Satisfactory performance is obtainable if at least 50% of the local magnetizations lie within the 90° quadrant which is symmetrically disposed around the direction of the circular remanence.

One source of anisotropy is magnetocrystalline, which refers to the preferred orientation of the magnetic moments ("spins") of the atoms (ferromagnetic atoms) in directions correlated with the axes which define the crystal structure. If the quiescent anisotropy has as its principal source the magnetocrystalline anisotropy associated with the atomic arrangements of a latticed structure possessing multiaxial symmetry, e.g., a randomly oriented polycrystalline material wherein each crystallite has cubic symmetry (including distorted cubic, e.g., tetragonal) with <100> or <111> easy axes, the quiescent circumferential remanence in more than 50% of the crystallites will automatically meet this "45°" requirement. The magnetocrystalline anisotropy in iron and all common steels have such cubic symmetry and thus (based solely on this requirement) are all candidate materials for the load cells of the present invention. The magnitude of the anisotropy of pure iron is generally reduced by common alloying elements, although tungsten and, to a lesser extent, manganese cause it to rise. Molybdenum, vanadium and tin cause relatively small downward changes, while chromium is slightly less sluggish in causing the anisotropy to decrease from that of pure Fe. Sufficient quantities of Ni, Co, Si or Al can drive the anisotropy to zero (and below). One concern is with the absolute magnitude of the crystal (short for magnetocrystalline) anisotropy being too low, since this is the "spring" that returns the magnetization to its quiescent circumferential direction when the load is removed. Thus, for example, if the crystal anisotropy ($K_1$) is smaller than $\lambda\sigma_r$, where $\sigma_r$ is the magnitude of residual stresses associated with prior processing of the shaft, then $K_1$ is no longer the principal anisotropy and more than 50% of the quiescent remanence may no longer meet the 45° distribution requirement. Here is the first glimpse of the importance of interrelationships between the several material properties that are individually important to the operation of the transducer. While $K_1$ and $\lambda$ are compositionally dependent (intrinsic) properties, $\sigma_r$ and other structure dependent properties (e.g., textures, chemical or structural ordering) act in concert with the intrinsic properties to determine the magnitude, orientation and symmetry of quiescent anisotropies. Also, while small amounts of Ni or Si effectively raise $\lambda$, they also tend to reduce $K_1$. Thus in selecting the appropriate alloy for the disk 12, we have to carefully moderate alloy content.

Examples of the categories of materials that have been found suitable for the load cells of the present invention are shown below. Typical grades in each category are indicated.

1. Martensitic Stainless Steels (preferably air hardened) AISI/SAE Grades: 403, 410, 414, 416, 420, 431, 440A, 440B, 440C
2. Precipitation Hardening Stainless Steels (chromium and nickel) AISI/SAE Grades: 15-5PH, 17-4PH, 17-7PH, PH 13-8Mo
3. Alloy Steels (quenched and tempered—sometimes carburized or nitrided) AISI/SAE Grades: 4140, 4320, 4330, 4340, 4820, 9310 Typical Designations: 300M, Aermet 100, 98BV40, 9-4-20, 9-4-30
4. Tool Steels (preferably quenched and tempered, metallurgically "clean" high alloy steels)
   AISI Grades: Types A, D, H, L, M, O, T, W and high cobalt high speed tool steels
5. Maraging Steels (high nickel, low carbon) Typical Designations: 18 Ni 250, C-250, Vascomax T-300, NiMark, Marvac 736
6. Ductile Permanent Magnet Materials Typical Designations: Vicalloy, Remendur, Cunife, Cunico, Vacozet
7. Magnet Steels Typical Designations: KS Steel, MT Steel, 3.6% Cr, 15% Co, Tungsten Steel
8. Specialized Alloys and Other Materials Typical Designations: Permendur, Alfer, Alfenol, Kovar, Hard Drawn Nickel, Hard Drawn Permalloy In the operation of the present load cell, magnetic fields arise from the active region on disk 12 and these fields pervade not only the space in which the field sensor(s) is located but also the space adjacent thereto where non-active ferromagnetic materials may be present. The magnetization changes caused to take place within non-active materials results in other fields arising and these (parasitic) fields also pervade the regions of space where the field sensor(s) are located. Thus, in the interest of not corrupting the transfer function of the active region, it is important that the parasitic fields be very small, ideally zero, in comparison with the active region field or, if of significant intensity, that they change linearly and anhysteretically (or not at all) with applied load, and that they be stable with time and under any of the operational and environmental conditions that the load cell might be subjected to. Stated otherwise, any parasitic fields which arise must be sufficiently small compared to the active region field that the net field seen by the magnetic field sensors is useful for force sensing purposes. Thus, in order to minimize the corrupting influence of parasitic fields, it is important to utilize a disk material having a coercivity sufficiently high that the field arising from the magnetoelastically active region does not magnetize non-active ferromagnetic regions proximate to the magnetoelastically active region to give rise to parasitic magnetic fields which are of sufficient strength to destroy the usefulness, for force sensing purposes, of the net magnetic field seen by the magnetic field sensor means. This generally means that the coercivity of the disk 12 is greater than 15 Oe, preferably greater than 20 Oe and most desirably greater than 35 Oe.

Compared to prior art strain gage load cells, the present invention offers a number of significant advantages. For example, load cells of the present invention are relatively easy to machine compared with the skilled hand labor required to attach and utilize strain gages. In addition, the circuitry required to detect the magnetic field produced by the disk member is significantly less costly than the circuitry associated with strain gages. Furthermore, magnetoelastic load cells are particularly stable, the zero value of the sensed quantity under zero load conditions being substantially unaffected by temperature, angular position of a rotating axially loaded member, rotational velocity and non-varying air gaps between the loaded member and the sensing means. As a consequence, such load cells are relatively easy to install and will operate reliably in difficult environments.

What is claimed is:

1. A magnetoelastic load cell for providing an output signal indicative of substantially axial forces applied to the load cell, comprising:

a magnetoelastically active region comprising a ferromagnetic, magnetostrictive disk member having an upper surface and a lower surface and comprising a central hub and an annular rim, said member having at least two slots formed therethrough between said hub and said rim for defining at least two generally spiral spokes extending between said upper surface and said lower surface of said member, each of said spokes traversing approximately 360° between its origin at said hub and its termination at said rim;

said spokes being magnetically polarized in a single circumferential direction about their axes and possessing sufficient magnetic anisotropy to return the magnetization in said spokes, following the application of a force to said load cell, to said single circumferential direction when the applied force is reduced to zero, whereby said applied substantially axial forces create a torsional stress within said spokes and, in the absence of any electrical excitation of said member, said member establishes opposite magnetic poles at said rim and said hub for producing a radially directed magnetic field between said poles which varies with said applied force;

magnetic field sensor means mounted proximate to said magnetoelastically active region and oriented with respect thereto to sense the magnitude of the magnetic field at said sensor means and provide said output signal in response thereto;

said member being formed of apolycrystalline material wherein at least 50% of the distribution of local magnetizations lie within a 90° quadrant symmetrically disposed around said single circular direction and having a coercivity sufficiently high that the field arising from said member does not magnetize regions of said member proximate to said member to give rise to parasitic magnetic fields which are of sufficient strength to destroy the usefulness, for force sensing purposes, of the net magnetic field seen by said magnetic field sensor means.

2. A magnetoelastic load cell, as claimed in claim 1, wherein said member is formed of a polycrystalline material wherein each crystallite has cubic symmetry.

3. A magnetoelastic load cell, as claimed in claim 2, wherein said member is formed of a material selected from the group consisting of martensitic stainless steels, precipitation hardening stainless steels containing chromium and nickel, quenched and tempered alloy steels, tool steels, high nickel content maraging steels, ductile permanent magnet materials, magnet steels, Permendur, Alfer, Kovar, hard drawn nickel and hard drawn Permalloy.

4. A magnetoelastic load cell, as claimed in claim 1, wherein the cross section of each said spoke is approximately square.

5. A magnetoelastic load cell, as claimed in claim 1, wherein the coercivity of said member is greater than 15 Oe.

6. A magnetoelastic load cell, as claimed in claim 1, wherein the coercivity of said member is greater than 20 Oe.

7. A magnetoelastic load cell, as claimed in claim 1, wherein the coercivity of said member is greater than 35 Oe.

8. A magnetoelastic load cell, as claimed in claim 1, wherein said magnetic field sensor means comprises a solid state sensor.

9. A magnetoelstic load cell, as claimed in claim 1, wherein said magnetic field sensor means comprises a flux gate inductor.

10. A magnetoelastic load cell, as claimed in claim 1, wherein said magnetic field sensor means is mounted and oriented with respect to said magnetoelastically active region to sense the polarity of said magnetic field.

11. A magnetoelastic load cell, as claimed in claim 10, wherein said magnetic field sensor means is mounted in a fixed position relative and proximate to said magnetoelastically active region.

12. A magnetoelastic load cell, as claimed in claim 10, wherein each of the upper and lower surfaces of said member is generally circular and said member has a central axis, said sensor means being positioned radially centered proximate said member between said hub and said annular rim.

13. A magnetoelastic load cell, as claimed in claim 12, wherein said sensor means comprises at least two sensors proximate one of the upper and lower surfaces of said member.

14. A magnetoelastic load cell, as claimed in claim 13, wherein said sensor means comprises at least two sensors proximate each of the upper and lower surfaces of said member.

15. A magnetoelastic load cell, as claimed in claims 13 or 14, wherein said sensors which are proximate each surface of said member are positioned in a circumferentially symmetrical, equiangular distribution around said surface.

16. A magnetoelastic load cell, as claimed in claim 1 wherein said sensor means are compliantly mounted to said member.

17. A magnetoelastic load cell, as claimed in claim 1, wherein said central hub and said annular rim are elevated above the upper surface of said spokes and define an annular window between said hub and rim and said sensor means are positioned within said window.

18. A magnetoelastic load cell, as claimed in claim 1, wherein said spokes have, in the absence of a force applied to said member, a circumferential magnetic orientation having no net magnetization component in the direction of the axis of said spokes.

19. A magnetoelastic load cell, as claimed in claim 18, wherein said spokes have, when force is applied to said member, a helical magnetic orientation having both circumferential components and components in the direction of the axis of said spokes, said magnetic field sensor means being positioned and oriented for sensing the magnetic field arising from said axial components of magnetization.

20. A method of sensing substantially axial forces comprising the steps of:

(a) providing a magnetoelastically active region including a surface to which said force is applied, said region comprising a ferromagnetic, magnetostrictive disk member having an upper surface and a lower surface and comprising a central hub and an annular rim, said member having at least two slots formed therethrough between said hub and said rim for defining at least two generally spiral spokes extending between said upper surface and said lower surface of said member, each of said spokes traversing approximately 360° between its origin at said hub and its termination at said rim, said spokes being magnetically polarized in a single circumferential direction about their axes and possessing sufficient magnetic anisotropy to return the magnetization in said spokes, following the application of a force to said surface, to said single circumferential direction when the applied force is reduced to zero, said magnetoelastically active region of said surface being formed of a polycrystalline material wherein at least 50% of the distribution of local magnetizations lie within a 90° quadrant symmetrically disposed around said single circular direction and having a coercivity sufficiently high that the field arising from said magnetoelastically active region does not magnetize regions of said member proximate to said magnetoelastically active region to give rise to parasitic magnetic fields which are of sufficient strength to destroy the usefulness, for force sensing purposes, of the net magnetic field seen by said magnetic field sensing means;

(b) in the absence of any electrical excitation of said member, establishing opposite magnetic poles at said rim and said hub for producing a radially directed magnetic field between said poles as a consequence of the application of said axial forces to said surface and their conversion to torsional forces within said spiral spokes, said magnetic field varying with said applied forces; and (c) sensing the magnitude of the magnetic field at a position proximate to said magnetoelastically active region as an indication of the magnitude of the forces applied to said surface.

21. A method, as claimed in claim 20, wherein the application of force to said surface causes said magnetoelastically active region to have a helical magnetic orientation with both circumferential and axial magnetization components and said sensing step comprises sensing the magnetic field arising from said axial components of said magnetization.

22. A method, as claimed in claim 21, wherein said member is formed of a polycrystalline material wherein each crystallite has cubic symmetry.

23. A method, as claimed in claim 20, wherein the coercivity of said magnetoelastically active region is greater than 15.

24. A method, as claimed in claim 20, wherein the sensing step is accomplished at least in part by positioning a magnetic field sensing device proximate to and spaced from said magnetoelastically active region.

* * * * *